United States Patent
Yin et al.

(10) Patent No.: US 11,054,912 B2
(45) Date of Patent: *Jul. 6, 2021

(54) THREE-DIMENSIONAL GRAPHICAL USER INTERFACE FOR INFORMATIONAL INPUT IN VIRTUAL REALITY ENVIRONMENT

(71) Applicant: Advanced New Technologies Co., Ltd., George Town (KY)

(72) Inventors: Huanmi Yin, Hangzhou (CN); Feng Lin, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/678,442

(22) Filed: Nov. 8, 2019

(65) Prior Publication Data

US 2020/0142498 A1 May 7, 2020

Related U.S. Application Data

(63) Continuation of application No. 15/720,635, filed on Sep. 29, 2017, now Pat. No. 10,474,242.

(30) Foreign Application Priority Data

Oct. 9, 2016 (CN) .......................... 201610881695.8

(51) Int. Cl.
*G06F 3/01* (2006.01)
*G06F 3/0488* (2013.01)
(Continued)

(52) U.S. Cl.
CPC .............. *G06F 3/017* (2013.01); *G06F 3/011* (2013.01); *G06F 3/0482* (2013.01);
(Continued)

(58) Field of Classification Search
CPC ...................................................... G06F 3/017
See application file for complete search history.

(56) References Cited

U.S. PATENT DOCUMENTS 9,383,895 B1 7/2016 Vinayak et al.
10,474,242 B2 11/2019 Yin et al.
(Continued)

FOREIGN PATENT DOCUMENTS

CN 102789313 11/2012
CN 204463032 7/2015
(Continued)

OTHER PUBLICATIONS

Chan, Youtube [Online], "LEAP Grab Gesture," Jan. 16, 2014, [retrieved on Jul. 29, 2019], retrieved from: URL <https://www.youtube.com/watch?v=xrx2SppAKV0>, 1 page [Video Submission].

(Continued)

*Primary Examiner* — James J Debrow
(74) *Attorney, Agent, or Firm* — Fish & Richardson P.C.

(57) ABSTRACT

Hand displacement data is received from sensing hardware and analyzed using a three-dimensional (3D) gesture recognition algorithm. The received hand displacement data is recognized as representing a 3D gesture. An operational position of the 3D gesture is calculated with respect to a 3D input graphical user interface (GUI). A virtual input element associated with the 3D input GUI and corresponding to the calculated operational position is selected. Input information corresponding to the selected virtual input element is read from the selected virtual element.

20 Claims, 7 Drawing Sheets

(51) Int. Cl.
*G06F 3/0484* (2013.01)
*G06F 3/0482* (2013.01)
*H04N 13/366* (2018.01)
*G02B 27/00* (2006.01)

(52) U.S. Cl.
CPC ...... *G06F 3/04842* (2013.01); *G06F 3/04886* (2013.01); *G02B 27/0093* (2013.01); *G06F 2203/04802* (2013.01); *G06F 2203/04803* (2013.01); *G06F 2203/04808* (2013.01); *H04N 13/366* (2018.05)

(56) References Cited

U.S. PATENT DOCUMENTS

| | | | |
|---|---|---|---|
| 2004/0128012 | A1 | 7/2004 | Lin |
| 2011/0090145 | A1 | 4/2011 | Lu |
| 2011/0307834 | A1 | 12/2011 | Wu |
| 2012/0038550 | A1 | 2/2012 | Lemmey et al. |
| 2012/0249475 | A1 | 10/2012 | Murphy et al. |
| 2013/0265220 | A1 | 10/2013 | Fleischmann et al. |
| 2013/0346911 | A1 | 12/2013 | Sripada |
| 2014/0225918 | A1 | 8/2014 | Mittal et al. |
| 2014/0240231 | A1 | 8/2014 | Minnen |
| 2014/0298273 | A1* | 10/2014 | Blackstone et al. .... G06F 3/017 |
| 2015/0067603 | A1 | 3/2015 | Tanaka |
| 2015/0177844 | A1 | 6/2015 | Chen |
| 2015/0193005 | A1 | 7/2015 | Di Censo et al. |
| 2015/0205484 | A1* | 7/2015 | Morishita et al. .. G06F 3/04815 |
| 2015/0235505 | A1 | 8/2015 | Keilwert et al. |
| 2015/0253844 | A1* | 9/2015 | Ueno et al. ............. G06F 3/011 |
| 2015/0262002 | A1 | 9/2015 | Matsunaga |
| 2016/0018985 | A1 | 1/2016 | Bennet et al. |
| 2016/0188861 | A1 | 6/2016 | Todeschini |
| 2016/0195935 | A1 | 7/2016 | Cronholm |
| 2016/0292779 | A1* | 10/2016 | Rose et al. ......... G06Q 30/0643 |
| 2017/0228130 | A1 | 8/2017 | Palmaro |
| 2018/0101239 | A1 | 4/2018 | Yin et al. |

FOREIGN PATENT DOCUMENTS

| | | |
|---|---|---|
| CN | 105573596 | 5/2016 |
| CN | 105892631 | 8/2016 |
| CN | 105912110 | 8/2016 |
| CN | 105955453 | 9/2016 |
| JP | 2011210239 | 10/2011 |
| JP | 2012146303 | 8/2012 |
| JP | 2014531662 | 11/2014 |
| JP | 2015232783 | 12/2015 |
| KR | 20110008313 | 1/2011 |
| TW | 201447375 | 12/2014 |
| TW | 201514830 | 4/2015 |
| WO | WO 2014162762 | 10/2014 |

OTHER PUBLICATIONS

Corvidude, Youtube [Online], "VR Hex keyboard using Leap Motion," Feb. 24, 2016, [retrieved on Jul. 29, 2019], retrieved from: URL <https://www.youtube.com/watch?v=ZERwYJVZOgk>, 1 page [Video Submission].

Crosby et al., "BlockChain Technology: Beyond Bitcoin," Sutardja Center for Entrepreneurship & Technology Technical Report, Oct. 16, 2015, 35 pages.

Eisenberg, Aviram; "Gesture Recognition and Its Importance in VR"; https://appreal-vr.com/blog/gesture-recognition-in-virtual-reality/; retrieved Sep. 29, 2017; 7 pages.

European Extended Search Report in European Patent Application No. 17859034.5. dated Aug. 6, 2019, 11 pages.

International Preliminary Report on Patentability in International Application No. PCT/US2017/054967, dated Feb. 11, 2019, 16 pages.

International Search Report and Written Opinion of the International Searching Authority issued in International Application No. PCT/US2017/054967 dated Dec. 11, 2017; 11 pages.

Luciani et al; "A Basic Gesture and Motion Format for Virtual Reality Multisensory Applications" Grapp 2006—Computer Graphics Theory and Applications; Acroe & ICA Laboratory, INPG, Grenoble, France; pp. 349-356.

Nakamoto, "Bitcoin: A Peer-to-Peer Electronic Cash System," www.bitcoin.org, 2005, 9 pages.

Oscillada, John Marco; "List of Gesture Controllers for Virtual Reality"; https://virtualrealitytimes.com/2017/02/16/vr-gesture-controllers/; Feb. 16, 2017; 10 pages.

Spectacular Ocular, "LeapMotion VR Hand Menu (work in progress)", Apr. 154, 2016, retreieved on Jul. 23, 2020, <https://www.youtube.com/watch?v=E81na2Vxpcw>, 1 page.

Magic Leap [online], "Magic Leap | Original Concept Video", Mar. 19, 2015, Retreived on Mar. 4, 2021, retrieved from URL <https ://www.youtu be. com/watch ?v=kPM H canqOx M>, 1 page.

Louis Houng [online], "Microsoft HoloLens | Official Trailer", Jan. 21, 2015, retreived on Mar. 4, 2021, retrieved from URL <https://www.youtube.com/watch?v=NAkkfMlnCEc>, 1 page.

* cited by examiner

THREE-DIMENSIONAL GRAPHICAL USER INTERFACE FOR INFORMATIONAL INPUT IN VIRTUAL REALITY ENVIRONMENT

This application is a continuation of U.S. patent application Ser. No. 15/720,635, filed on Sep. 29, 2017, which claims priority to Chinese Patent Application No. 201610881695.8, filed on Oct. 9, 2016, the entire contents of which are hereby incorporated by reference.

BACKGROUND

Virtual Reality (VR) technology uses computer processing, graphics, and various type of user interfaces (for example, visual display goggles and interactive controllers held in one or more hands) to produce an immersive, user-perceived three-dimensional (3D) environment (a "virtual world") with interactive capabilities. Applications of VR technology (for example, in education, video games, business, science, and medicine) are increasing with continued improvements in computing hardware and software used in VR technology. While VR technology can provide a user with a convincing lifelike visual experience of a virtual world, conventional user interaction with a scenario within the 3D environment has proven to be difficult or awkward, particularly with respect to informational input (for example, alphanumeric textual data). Increasing ease and speed of informational input is necessary to improve overall user experience with VR technology.

SUMMARY

The present disclosure describes three-dimensional (3D) graphical user interface (GUI) for informational input in a virtual reality (VR) environment.

In an implementation, hand displacement data is received from sensing hardware and analyzed using a three-dimensional (3D) gesture recognition algorithm. The received hand displacement data is recognized as representing a 3D gesture. An operational position of the 3D gesture is calculated with respect to a 3D input graphical user interface (GUI). A virtual input element associated with the 3D input GUI and corresponding to the calculated operational position is selected. Input information corresponding to the selected virtual input element is read from the selected virtual element.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, described 3D user interfaces increase ease and speed of informational input in a VR environment. For example, the described 3D user interfaces and provided hand-based gestures make informational input more natural and intuitive for a user in the VR environment. Second, enhancements to informational input help to improve overall user experience with VR technology. Third, improvements to overall user experience with VR technology informational input can help expand application of VR technology to additional usage scenarios. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DESCRIPTION OF DRAWINGS

Like reference numbers and designations in the various drawings indicate like elements.

DETAILED DESCRIPTION

Figure 1:
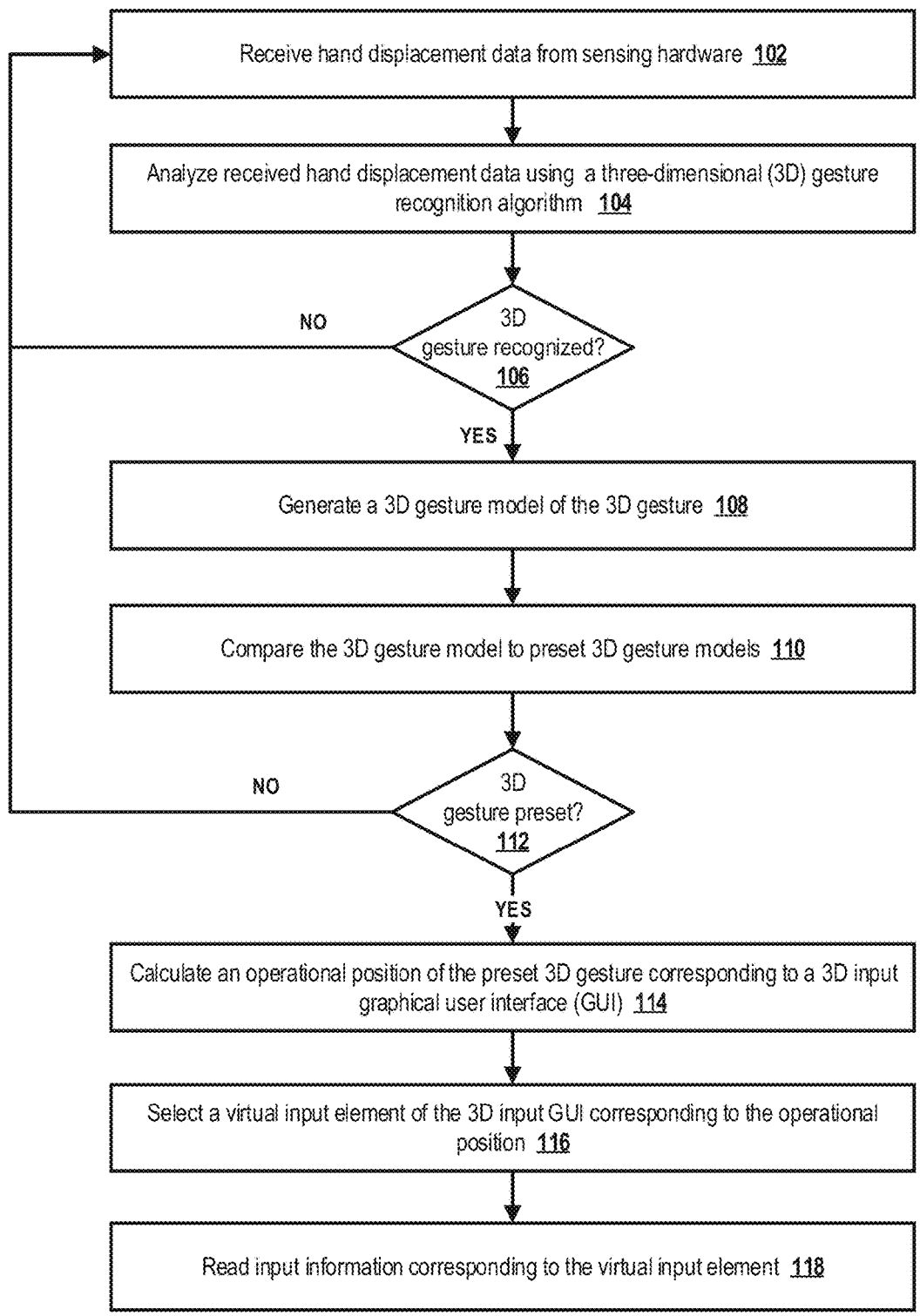
FIG. 1 is a flow chart illustrating an example of a method for use of three-dimensional (3D) input graphical user interfaces (GUIs) for informational input in a virtual reality (VR) environment, according to an implementation of the present disclosure.

The following detailed description describes three-dimensional (3D) graphical user interfaces (GUIs) for informational input in a virtual reality (VR) environment, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined can be applied to other implementations and applications, without departing from the scope of the present disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

VR technology uses computer processing, graphics, and various type of user interfaces (for example, visual display goggles and interactive controllers held in one or more hands) to produce an immersive, user-perceived 3D environment (a "virtual world") with interactive capabilities. Applications of VR technology (for example, in education, video games, business, science, and medicine) are increasing with continued improvements in computing hardware and software used in VR technology. While VR technology can provide a user with a convincing lifelike visual experience of a virtual world, conventional user interaction with a scenario within the 3D environment has proven to be difficult or awkward, particularly with respect to informational input (for example, alphanumeric textual data). Increasing ease and speed of informational input is necessary to improve overall user experience with VR technology.

Described are 3D user interfaces that can increase ease and speed of informational input in a VR scenario. For example, the described 3D user interfaces and associated hand-based gestures can make informational input more natural and intuitive for a user in a VR environment while executing a particular VR scenario (for example, shopping, navigating through a document, or rotating a virtual object). Enhancements to informational input can improve overall user experience with VR technology, which can help expand application of VR technology to additional usage scenarios.

In an implementation, a VR terminal can provide a user interface for a user to interface with VR technology. For example, a VR terminal can include a VR headset worn on the user's head providing visual displays to display graphics and other data providing a 3D immersive experience for the user (for example, using a VR-based application).

The graphics and other data are provided by a VR client terminal (for example, a software application) communicatively coupled to the VR terminal. The VR client terminal outputs a virtual reality model developed by a developer as a VR scenario in a VR environment. As an example, the VR terminal can be a sliding-type VR headset in which a mobile computing device (such as, a smartphone or tablet) can be inserted to provide a visual-type display and other computing functionality (for example, user input, visual input, spatial orientation, movement detection, audio generation, network connectivity, and an attachment for other user interface devices). In this example, the mobile computing device can act in whole or in part as the VR client terminal or as an interface for a separate VR client terminal (for example, a PC-type computer connected to the mobile computing device).

To assist with informational input, various types of data and operations can be pre-configured to provide some ease of use/access. For example, a user could configure a type and amount of a pre-set virtual currency for use in the VR shopping scenario. To initiate payment, the user could select a single "Pay with Virtual Currency" button displayed in the VR environment to initiate payment with the virtual currency. However, when a need to input a large amount of information or to perform multiple actions arise in a particular scenario within a VR environment, conventional informational input techniques can prove to be awkward and time consuming.

A first informational input technique includes a user taking off the VR terminal and removing a mobile computing device (for example, a smartphone or tablet-type computer) from the VR terminal to input information (such as, a password for a payment or a video game account login) using a GUI provided by the mobile computing device. Alternatively, the user can use a different computing device (for example, a PC-type computer or other mobile computing device) connected the mobile computing device to input information.

A second informational input technique includes use of an external input device (such as, a joystick, a handle, or other device held in one or more hands) to control an operational focus (such as, an icon, pointer, or other graphical element) in a VR environment. For informational input, the user can move the operational focus to a position of a virtual element and then actuate (for example, click, depress, or slide) a button or other element provided on the external input device, to select and trigger the virtual element to input associated information.

In a third informational input technique, a timeout duration can be preset and a user can control a position of an operational focus in the VR environment through head posture or a head gesture associated with the VR terminal. After the operational focus is moved to a position of a particular virtual element desired for informational input, the user maintains the operational focus at the position of the particular virtual element (for example, hovers over the virtual element). Once the operational focus is maintained at the position of the virtual element for at least the timeout duration, the virtual element is selected and triggered.

In a particular example, assume that a user is required to enter a payment password in a VR shopping scenario. In the first technique, the user is required to remove the VR terminal to complete informational input, which interrupts the user's immersive VR experience and takes additional time to complete the payment process. In the second technique, the VR client terminal must be configured to coordinate with an external device (such as, a joystick) which increases hardware costs and introduces complexity into interaction with the VR environment. In the third technique, a user is required to wait at least for the expiration of the timeout duration to trigger each virtual element, which adversely affects efficiency and rapidity of informational input by a user in a VR environment.

Described is an input method for efficient and rapid input of information by a user in a VR environment. A 3D input GUI in a VR environment recognizes a pre-set 3D gesture performed by a user. An operational position of the 3D gesture is calculated and a virtual input element corresponding to the calculated operational position is determined. The determined virtual element is selected, and information associated with the virtual element is read for input. Efficient input of information by the user in the VR environment is enabled through the use of a series of rapid 3D gestures.

FIG. 1 is a flow chart illustrating an example of a method 100 for use of 3D input GUIs for informational input in a VR environment, according to an implementation of the present disclosure. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

At 102, hand displacement data form sensing hardware is received. From 102, method 100 proceeds to 104.

At 104, the received hand displacement data is analyzed using a 3D gesture recognition algorithm. From 104, method 100 proceeds to 106.

At 106, a determination is made whether a 3D gesture is recognized. A 3D gesture (refer to FIG. 4 for examples of 3D gestures) of a user is recognized in a VR environment while executing a VR scenario displayed in a VR terminal. The 3D gesture is a user gesture which has depth information and is recognized (for example, through the hand displacement data captured by visual sensors coupled to the VR terminal). Depth information refers to coordinate information of the user gesture with respect to a Z-axis of the virtual reality scenario. For example, a point in a three-dimensional space can be expressed as (X, Y, and Z) through three-dimensional coordinates. In this case, a Z-axis coordinate value corresponding to the point may be referred to as depth information with respect to an X-axis and a Y-axis. If a 3D gesture is recognized, method 100 proceeds to 108. If a 3D gesture is not recognized, method 100 returns to 102.

At 108, a 3D gesture model of the recognized 3D gesture is generated. From 108, method 100 proceeds to 110.

At 110 the 3D gesture model is compared to one or more preset 3D gesture models. Particular 3D gestures can be preset as applicable for certain 3D input GUIs. From 110, method 100 proceeds to 112.

At 112, a determination is made whether the recognized 3D gesture is a preset 3D gesture based on the comparison at 110. If it is determined that the recognized gesture is a preset 3D gesture, method 100 proceeds to 114. If it is determined that the recognized gesture is not a preset 3D gesture, method 100 returns to 102. From 112, method 100 proceeds to 114.

At 114, an operational position of the preset 3D gesture is calculated in relation to a 3D input GUI. The 3D input GUI refers to a 3D interface output in the VR scenario and used for informational input. The 3D input GUI can include several virtual input elements, and each virtual input element can indicate a piece of corresponding input information. For example, in an implementation, the 3D input GUI can be a 3D virtual keyboard ("3D air keyboard"). In this case, the several virtual input elements may be several virtual "keys" included as part of the 3D virtual keyboard, and each virtual key indicates a corresponding input character. In this described implementation, to enable a user to rapidly complete informational input in a VR scenario while wearing a VR terminal, the 3D virtual keyboard associated with the VR scenario can be output into in immersive 3D VR environment. While wearing the VR terminal, the user can perform a particular 3D gesture associated with the VR scenario in the VR environment. The 3D gesture can trigger a virtual input element (a key) associated with the 3D virtual keyboard. From 114, method 100 proceeds to 116.

At 116, a virtual input element of the 3D input GUI is selected corresponding to the calculated operational position. From 116, method 100 proceeds to 118.

At 118, input information corresponding with the selected virtual input element is read. After 118, method 100 stops.

In some implementations, a technical solution includes three particular stages: 1) creation of a VR scenario model; 2) recognition of a 3D gesture; and 3) informational input.

1) Creation of a VR Scenario Model

In some implementations, a VR developer can complete creation of a VR scenario model by using a modeling tool (for example, UNITY, 3DSMAX, or PHOTOSHOP). The modeling tool can be, for example, proprietary, commercial, open source, or a combination of these types of modeling tools.

In some instances, the VR scenario model and texture map(s) associated with the VR scenario can be obtained from real-world scenarios. For example, a texture map of a material and a planar model of a real scenario may be obtained by advance photography. Using the modeling tool, texture can be processed and a 3D model of the real scenario established. In some implementations, the processed texture and the 3D model can be imported to a UNITY3D platform and image rendering carried out in multiple aspects (such as, a sound effect, a GUI, a plug-in, and lighting in the UNITY3D platform). Interaction software code is then written for the VR scenario model. A 3D input GUI for informational input can also be created for use with the VR scenario model to permit rapid informational input in the VR scenario. Any input GUI for use with a VR scenario that is consistent with this disclosure is considered to be within the scope of this disclosure, including input GUI of differing dimensions (for example, two-dimensional (2D) or four-dimensional (4D) GUIs).

Figure 2:
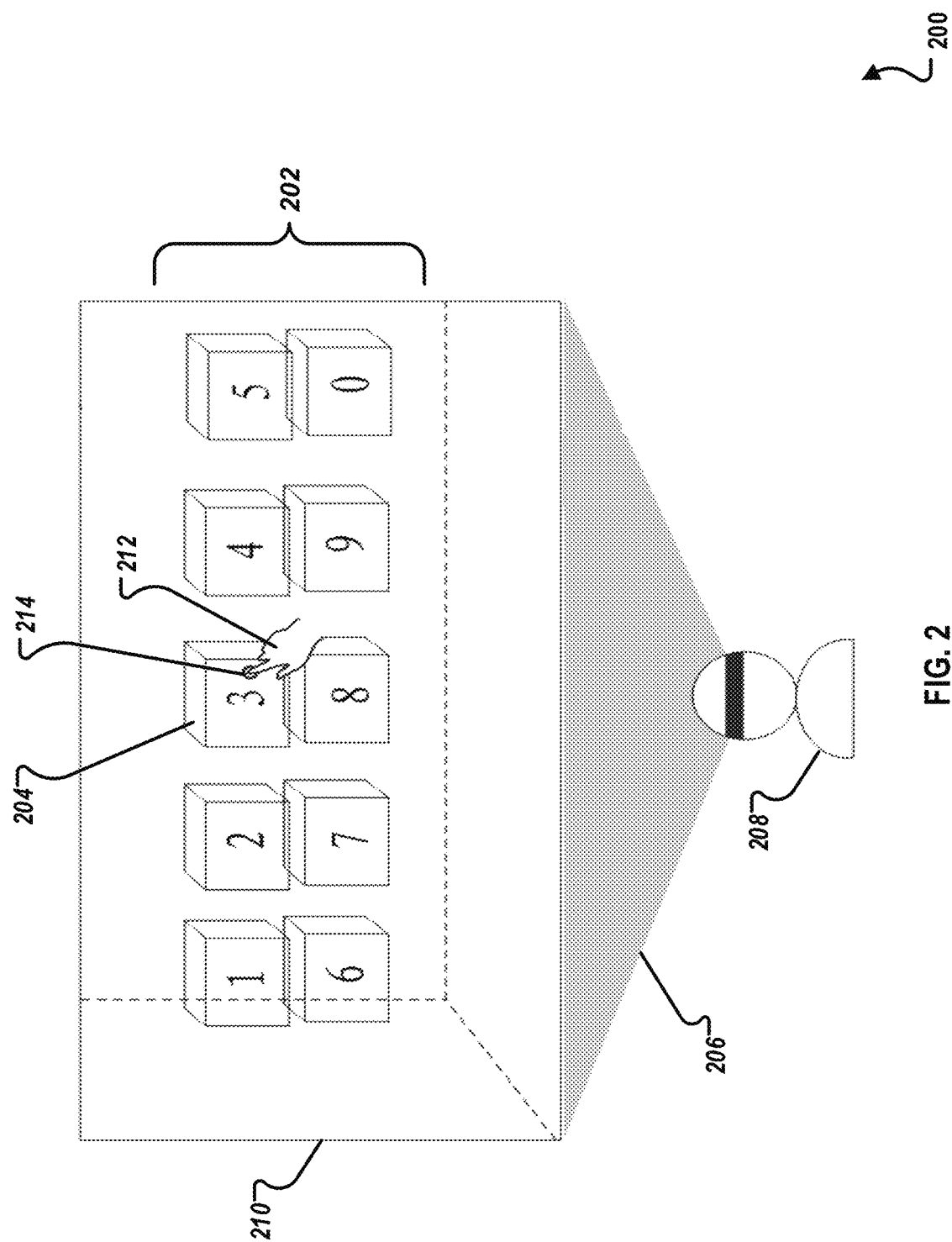
FIG. 2 is a diagram illustrating a 3D input GUI for informational input in a VR environment, according to an implementation of the present disclosure.

FIG. 2 is a diagram 200 illustrating a 3D input GUI for informational input in a VR environment, according to an implementation of the present disclosure. As illustrated, a 3D input GUI 202 (for example, a "3D air keyboard") includes ten 3D virtual input elements ("keys") (for example, virtual input element 204 corresponds to the number '3'). The 3D input GUI 202 is displayed in a user field 206 of a user 208 in as part of a VR scenario displayed in VR environment 210, where the ten 3D virtual input elements are tiled in two rows.

In a particular VR scenario, the user 208 can select a particular virtual input element (for example, virtual input element 204) using a particular 3D gesture, to complete input of digital information such as a password. For example, FIG. 2 shows that the user performs a 3D gesture 212 (a one-finger click/tap) at position 214 in the VR environment 210. Position 214 corresponds to where virtual input element 204 (the "3" key) is located in the VR environment 210. Selecting virtual input element 204 completes input of the digit '3.'

Figure 3:
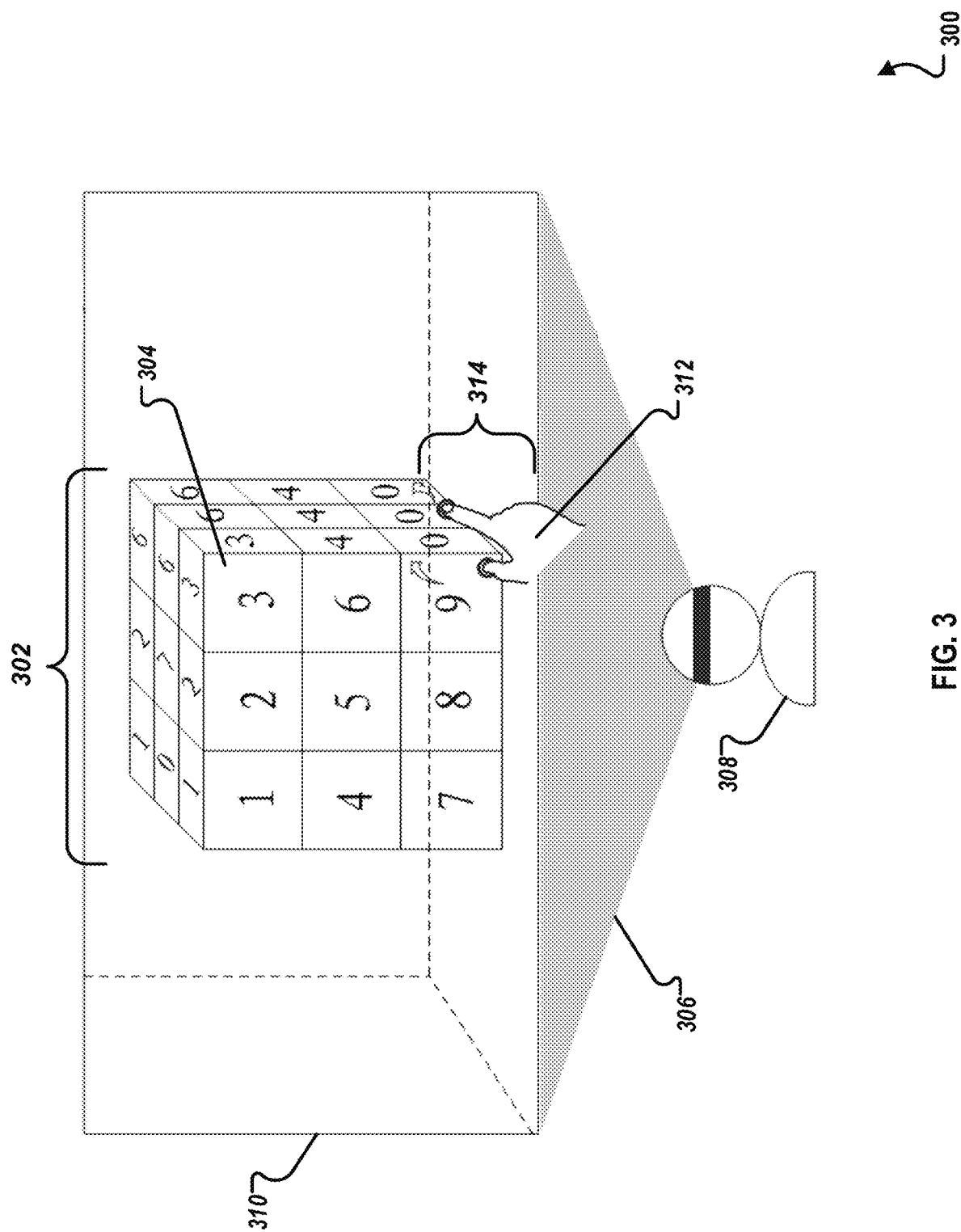
FIG. 3 is a diagram illustrating a different 3D input GUI for informational input in a VR environment, according to an implementation of the present disclosure.

FIG. 3 is a diagram illustrating a different 3D input GUI for informational input in a VR environment, according to an implementation of the present disclosure. As illustrated, a 3D input GUI 302 (for example, a "3D digital magic cube keyboard") includes twenty-seven 3D virtual input elements ("keys") (for example, virtual input element 304 corresponds to the number '3'). The 3D input GUI 302 is displayed in a user field 306 of a user 308 as part of a VR scenario displayed in VR environment 310, where the twenty-seven 3D virtual input elements are arranged in a cube. In some implementations, the digits or other data (for example, images or symbols) displayed on the virtual input elements can be displayed in particular patterns or randomly.

In a particular VR scenario, the user 308 can select a particular virtual input element (for example, virtual input element 304) using a particular 3D gesture (such as a one-finger click/tap), to complete input of digital information such as a password. To access other virtual input elements, the user can perform other 3D gestures. For example, FIG. 3 shows that the user performs a 3D gesture 312 (a two-finger rotation) at position 314 in the VR environment 310. Position 314 corresponds too approximately where virtual input element 304 (the "3" key) is located in the VR environment 310. If 3D gesture 312 is performed, the cube of virtual input elements will rotate in a counter-clockwise direction and permit of other virtual input elements to be selected.

As will be appreciated by those of ordinary skill in the art, the 3D input GUIs illustrated in FIGS. 2 and 3 are only particular possible implementations of 3D input GUIs. FIGS. 2 and 3 are not meant to limit the disclosure in any way. Other 3D input GUIs consistent with this disclosure are also considered to be within the scope of this disclosure.

Following completion of a VR scenario model (as previously described) and modeling of an associated 3D input GUI, a VR client terminal can be used to output the VR scenario model and the 3D input GUI to a user through a VR terminal (such as a VR headset) connected to the VR client terminal.

In some implementations, by default, the VR client terminal may output only the VR scenario model to the user in the VR environment. When the user needs to input information during an immersive experience associated with the VR scenario, the VR client terminal can output the associated 3D input GUI in the VR environment in response to a triggering preset 3D gesture made by the user with respect to a present virtual trigger element (such as, a virtual button).

As an example, a user wearing a VR terminal and engaged in a VR scenario can trigger a virtual trigger element to display 3D input GUI. As a particular example, a user could participate in a VR shopping scenario where several commodities can be presented for the user to choose from and select to purchase. To complete payment for a selected commodity, the user can select a "buy/pay" virtual button in the VR environment through a particular preset 3D gesture. In this case, the VR client terminal outputs a 3D input GUI "3D checkout counter" (with virtual keyboard) in the VR environment for use in the VR scenario. The user can select and trigger input of information through repeated 3D gestures using the "3D checkout counter."

2) Recognition of a 3D Gesture

In some implementations, when a user is wearing the VR terminal, to interact with a VR scenario displayed in a VR environment, the user is not required to use auxiliary hardware devices (such as, a joystick, haptic gloves, or other devices), but can form 3D gestures with their hands in front of themselves in midair. The formed 3D gestures are captured, analyzed, and displayed in the VR environment (similar to augmented reality) in relation to a 3D input GUI associated with a VR scenario. In other implementations, the user can use auxiliary hardware devices to control an operational focus, perform selections, or other actions consistent with this disclosure.

A user can perform a particular 3D gesture to select a virtual element (such as a virtual button, an operable control, or a page) provided by a VR scenario. As will be appreciated by those of ordinary skill in the art, the disclosure is not limited only to illustrated 3D gestures, but to any gesture (3D or otherwise) consistent with this disclosure. For example, a 3D gesture can be simple (such as, a simple click/tap gesture) or complex (such as, a particular gesture for selecting a virtual element). 3D gestures can also be static (such as, a particular hand posture) or dynamic (such as, gripping, dragging, and rotation). In some implementations, 3D gestures can be customized based on particular requirements of a VR scenario or to differentiate differences with respect to other VR content providers.

Figure 4:
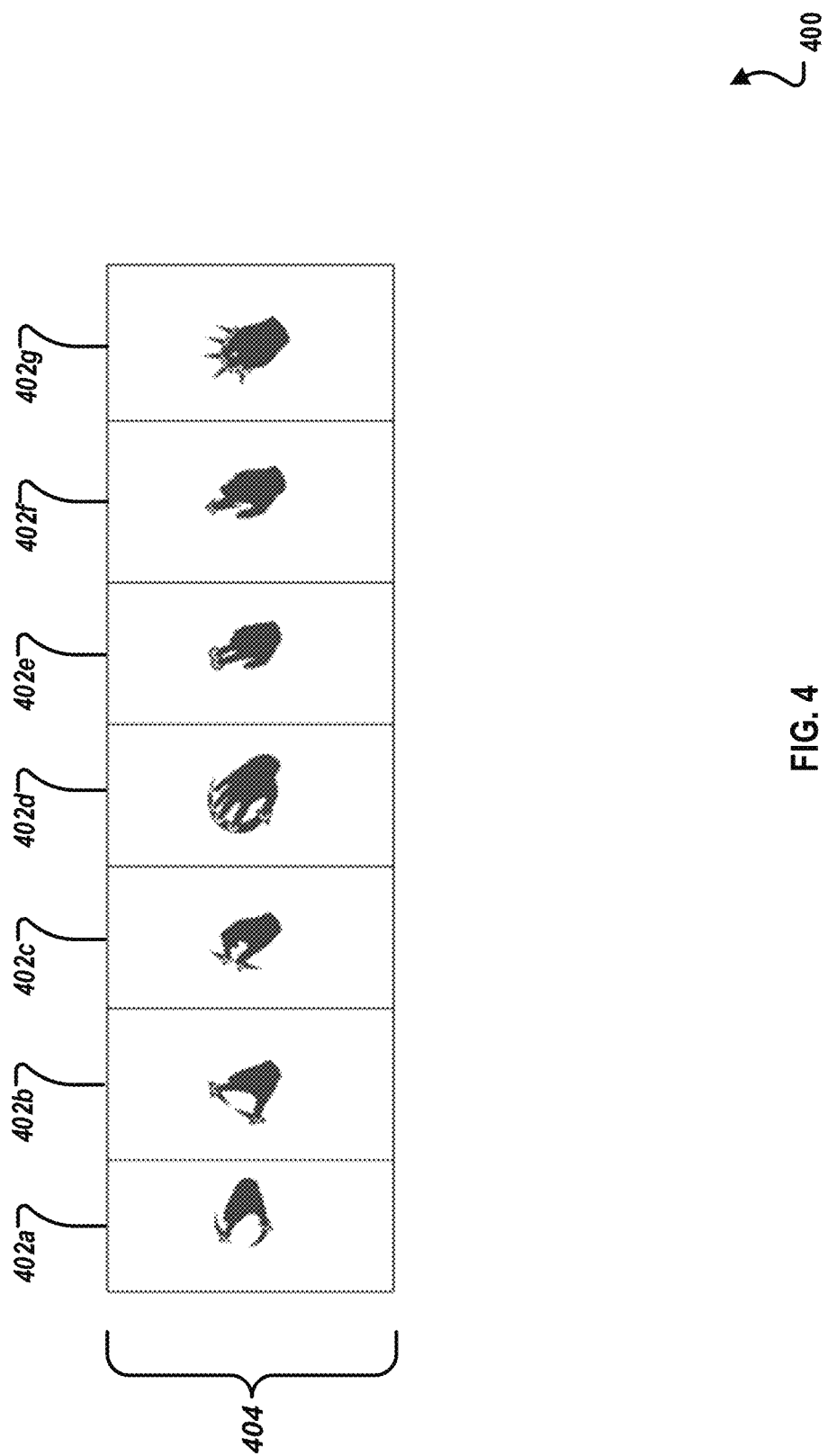
FIG. 4 is a diagram illustrating example 3D gestures that can be used for selecting and triggering a virtual element in a VR environment, according to an implementation of the present disclosure.

FIG. 4 is a diagram 400 illustrating example 3D gestures that can be used for selecting and triggering a virtual element in a VR environment, according to an implementation of the present disclosure. FIG. 4 illustrates example 3D gestures:

402*a*—Turn/rotate (Two-finger)
402*b*—Spread (Two-finger)
402*c*—Pinch (Two-finger)
402*d*—Turn/rotate (Five-finger)
402*e*—Click/tap (Two-finger)
402*f*—Swipe (One-finger)
402*g*—Pinch (Five-finger)

In some implementations, 404 can be a GUI element displayed in a VR environment for a particular VR scenario. GUI element 404 can be displayed to provide information to a user with respect to 3D gestures applicable to the particular VR scenario.

In some implementations, the VR client terminal can recognize, through sensing hardware coupled to the VR terminal and in combination with a preset 3D gesture recognition algorithm, a 3D gesture performed by the user in a VR scenario. In some implementations, the VR client terminal can track user hand displacement in real-time using the sensing hardware. The sensing hardware can collect and transmit hand displacement data (for example, position coordinates and a movement track) to the VR client terminal for analysis/processing.

In some implementations, the sensing hardware can include, for example, one or more sensors for collecting image-related visual, non-visual (such as, infrared and ultraviolet), laser, radar, and ultrasonic data. In some implementations, a 3D gesture can be recognized by using, for example, a dual-camera binocular imaging solution, a Time-of-Flight (TOF)-type solution, a structured light solution, and a micro-radar solution.

With respect to 3D gesture recognition based on the dual-camera binocular imaging solution, the sensing hardware can include one or more image sensors. The VR client terminal can track hand displacement of the user in real-time through a dual-camera image sensor, and collect hand displacement data of the user for analysis/processing. The VR client terminal performs calculations on the hand displacement data of the user using the 3D gesture recognition algorithm, to calculate the rotation quantity and offset of the hand of the user with respect to the X/Y/Z-axes of the VR scenario. The VR client terminal uses the calculated rotation quantity and offset to perform 3D gesture modeling to generate a final 3D gesture model.

With respect to 3D gesture recognition based on the TOF solution, the sensing hardware can include an infrared sensor. With respect to 3D gesture recognition based on the structured light solution, the sensing hardware can include a laser sensor. With respect to 3D gesture recognition based on the micro-radar solution, the sensing hardware can include a radar sensor. In typical implementations, recognizing the 3D gesture of the user based on the TOF solution, the structured light solution, and the micro radar solution are the same in principal as the dual-camera binocular imaging solution. In each of the described solutions, depth information is calculated (for example, using the rotation quantity and offset based on hand displacement data) to permit 3D gesture modeling.

After receiving the hand displacement data, the VR client terminal can analyze the hand displacement data using a preset 3D gesture recognition algorithm to determine whether a 3D gesture is recognized.

If a 3D gesture is recognized, a determination can be made as to whether the recognized 3D gesture is a preset 3D gesture.

In some implementations, when recognizing a 3D gesture using the 3D gesture recognition algorithm, the VR client terminal can calculate a rotation quantity and an offset of the hand of the user with respect to an X/Y/Z-axes of a VR scenario based on collected hand displacement data. In some implementations, the rotation quantity with respect to the X/Y/Z-axes can refer to a deviation angle by which a pre-selected feature point on the hand of the user is rotated with respect to the X/Y/Z-axes of the VR scenario, which serves as a rotation axis, when the hand of the user performs a particular 3D gesture. In some implementations, the offset can refer to a horizontal distance from the pre-selected feature point on the hand of the user to the X/Y/Z-axes of the VR scenario when the hand of the user performs the particular 3D gesture.

3D modeling of the 3D gesture can be carried out by the VR client terminal based on the obtained rotation quantity and offset. Once a 3D model (a 3D gesture model) of the 3D gesture is complete, recognition of the 3D gesture is considered complete.

Combining the rotation quantity and the offset permits accurate determination of depth information associated with the performance of the 3D gesture by the hand of the user. 3D modeling of the 3D gesture based on the determined depth information can accurately represent the 3D gesture of the user.

The VR client terminal can predefine a preset 3D gesture for selecting particular virtual elements in a VR scenario. When recognizing a 3D gesture, the VR client terminal can identify whether a recognized 3D gesture is a particular preset 3D gesture. For example, the generated 3D gesture model can be compared against 3D gesture models associated with preset 3D gestures (such as, 3D gestures illustrated in FIG. 4). If the recognized 3D gesture is determined to be a preset 3D gesture, the VR client terminal can perform an action associated with the preset 3D gesture (for example, selecting a particular virtual element).

While wearing the VR terminal, user vision outside of the VR terminal is typically restricted and a user cannot see an actual 3D gesture made by their hand. Because of this, the accuracy and position of the 3D gesture associated with a user's hand can be affected. To mitigate these issues, the VR client terminal can output an operational focus in the VR environment with respect to the VR scenario. The operational focus is configured to correspond to the 3D gesture of the user and to reflect spatial displacement in real-time. For example, the VR client terminal can calculate, in real-time, an operational position of the hand of the user for display in the VR environment. The operational position is calculated using the hand displacement data collected by the sensing hardware by tracking, in real-time, the hand of the user. In this way, real-world 3D gestures of the user can be represented by a displayed and moving operational focus, in real-time, in the VR environment.

In some implementations, the operational focus can include an icon, pointer, or other graphical element (for example, a representation of a human hand). The operational focus can also be animated to simulate a 3D gesture performed by a user. For example, the VR client terminal generates a 3D gesture model corresponding to a 3D gesture of the user by means of 3D gesture modeling based on the depth information of the hand of the user. Because the 3D gesture model generally represents accurate parameters associated with the hand of the user (such as, position coordinates and displacement change of the hand of the user), a corresponding 3D gesture animation can be rendered by using the 3D gesture model. The rendered 3D gesture animation can be used as the operational focus to correspond with synchronous spatial displacement of the user's hand performing the associated 3D gesture.

When immersed in a VR scenario, a user can accurately observe, in real-time, a particular 3D gesture which is currently being made by their hand through use of the displayed operational focus. In some implementations, the VR client terminal can visually prompt (for example, with provided animations) a user to change/modify their particular 3D gesture to conform to one or more preset 3D gestures. In this way, the user can correct their formation of a 3D gesture to reduce the possibility of an incorrect/failed input caused by an inaccurate, inadvertent, or unknown gesture.

In some implementations, the VR client terminal can store preset 3D gesture models for matching against the generated 3D gesture model of the user's 3D gesture. Upon recognition of the 3D gesture of the user, the VR client terminal can select several corresponding feature points from the generated 3D gesture model and a preset 3D gesture model. The VR client terminal performs matching operations using the selected feature points to determine if rotation quantities and offsets with respect to the X/Y/Z-axes of the VR scenario match to determine whether the user's 3D gesture corresponds to the preset 3D gesture. As an exact match of feature points between the generated 3D gesture model and a preset 3D gesture model is improbable, the VR client terminal can determine a similarity match between the generated 3D gesture model and a preset 3D gesture model using a preset threshold value. For example, if the preset threshold is met or exceeded, the generated 3D gesture model and the preset 3D gesture model can be considered to match. In some implementations, the matching can be determined by a preset similarity algorithm executed by the VR client terminal. The preset threshold value can be set to differing values depending upon particular needs of a VR scenario (for example, actions requiring fine-grained selections could have a preset threshold with a high value, while a general rotation operation could have a preset threshold with a low value).

3) Informational Input

When the VR client terminal determines that the 3D gesture of the user is a preset 3D gesture, the VR client terminal can calculate an operational position of the 3D gesture within the VR environment, and then select a virtual element associated with the VR scenario that corresponds to the operational position. For example, the VR client terminal can calculate, in real-time an operational position of the hand of the user in the VR environment according to the hand displacement data which is collected by the sensing hardware by tracking the hand of the user in real time. After calculating the operational position, the VR client terminal can search the VR scenario for a virtual element corresponding to the operational position, and then select the virtual element.

If an operational focus corresponding to the 3D gesture of the user is already displayed in the VR environment, the VR client terminal can also locate the position of the operational focus to determine the operational position of the hand of the user in the VR environment. Here, the VR client terminal can search for a virtual element indicated in the VR scenario by the operational focus, and then select the virtual element.

In some implementations, in order to reduce possible operational failures caused by a lengthy duration associated with a 3D gesture made by the user, the VR client terminal can set a preset duration threshold for indicating whether the 3D gesture is valid. After recognizing the 3D gesture of the user, the VR client terminal can calculate an overall duration of the 3D gesture (that is, a time difference from the moment when the user starts making the gesture to the moment when the gesture is finished), and then determine whether the duration of the 3D gesture is lower than the preset duration threshold. If the duration of the 3D gesture is lower than the preset duration threshold, the 3D gesture is considered to be valid. If the duration of the 3D gesture is equal to or greater than the preset duration threshold, the 3D gesture is considered to be invalid. Once determined to be valid, the VR client terminal may can then determine whether the 3D gesture is a preset 3D gesture.

The value of the preset duration threshold can vary depending on particular VR scenarios and VR-related operations. For example, the preset duration threshold can be set to a short duration (such as, two second) so that a user can rapidly form a preset 3D gesture within a short period of time to select a virtual element in a VR scenario.

Is it assumed that a preset virtual trigger element is provided in advance in a VR scenario that enables a user to trigger the VR client terminal to output a preset 3D input GUI. For example, if needing to input information while interfacing with a VR scenario in a VR environment, the user can move an operational focus to a position where the virtual trigger element is located to trigger the virtual trigger element (for example, by keeping the operational focus hovering above the virtual trigger element). As a particular example, the user can control the movement of the operational focus by using an external device (such as, a joystick or a handle). Alternatively, a gravity sensor can be pre-installed on the VR terminal, or the user can wear a corresponding gravity sensing means on a hand, so that the user can control the movement of the operational focus through head movement/posture or through the movement of the hand.

After the operational focus is kept hovering above the virtual trigger element, the user can make a preset 3D gesture with a hand at the position indicated by the operational focus. After the VR client terminal identifies that the 3D gesture made by the user is a preset 3D gesture, since the operational focus is kept hovering above the virtual trigger element, a virtual element indicated by the operational focus is considered the virtual trigger element for actuation. The VR client terminal can select the virtual trigger element, and trigger the VR scenario to output the 3D input GUI.

After a 3D input GUI is displayed in the VR terminal, the user can input information indicated by virtual input elements associated with the 3D input GUI. Based on the user's input requirement(s), the user can cause the operational focus to hover above a particular virtual input element, and then form a preset 3D gesture with their hand to select the particular virtual input element. In some implementations, a preset 3D gesture for selecting the virtual trigger element can be the same or different from a preset 3D gesture for selecting the virtual input element in the 3D input GUI.

After determining that the 3D gesture made by the user is a preset 3D gesture, the VR client terminal can calculate an operational position of the 3D gesture with respect to the VR scenario. The VR client terminal can then search the 3D input GUI for a particular virtual input element corresponding to the operational position, and select the particular virtual input element. In some implementation, the VR client terminal can emphasize the virtual input element in the 3D input GUI. For example, the selected virtual input element can be highlighted in the 3D input GUI (such as, using a different color or flashing).

Following selection of the virtual input element in the 3D input GUI, the VR client terminal can read information corresponding to the virtual input element (for example, a letter or digit). The read information can then be used for informational input. The user can select additional virtual input elements to input additional information (for example, a sequence of alphanumeric characters forming a password). In cases were a payment password is entered, after the entered payment password is verified (for example, by a payment server), a purchase of a selected commodity can be completed.

Figure 5:
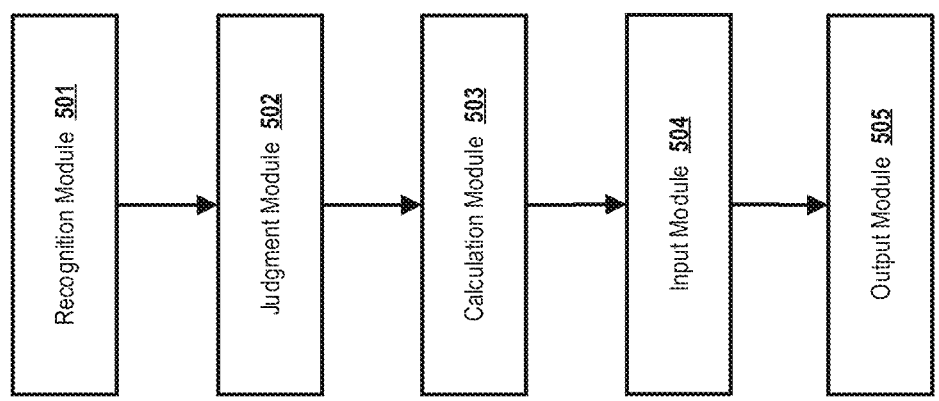
FIG. 5 is block diagram illustrating an example of computing modules used for input operations associated with a VR client terminal, according to an implementation of the present disclosure.

FIG. 5 is block diagram illustrating an example of computing modules 500 used for input operations associated with a VR client terminal, according to an implementation of the present disclosure. A VR scenario is output by the virtual reality client terminal in a VR environment and displayed by a VR terminal. The VR scenario includes a 3D input GUI. In some implementations, the VR scenario includes a preset virtual trigger element used for triggering output of the 3D input GUI in the VR scenario. In some implementations, the 3D input GUI can be a 3D virtual keyboard and a virtual input element can be a virtual key associated with the 3D virtual keyboard. The VR scenario includes an operational focus corresponding to a 3D gesture, where the operational focus has a synchronous displacement with the 3D gesture in the VR scenario. In some implementations, the operational focus is displayed as an animation simulating the 3D gesture.

In some implementations, a recognition module 501 is configured to recognize a 3D gesture of a user in the VR scenario. In some implementations, the recognition module 501 is configured to also: 1) track hand displacement of the user by using preset sensing hardware; 2) acquire hand displacement data of the user collected by the sensing hardware; 3) calculate a rotation quantity and an offset of a hand of the user with respect to an X/Y/Z axis of the VR scenario on the basis of the hand displacement data; and 4) perform 3D modeling based on the rotation quantity and the offset, to obtain the corresponding 3D gesture. A judgment module 502 is configured to determine whether the recognized 3D gesture is a preset 3D gesture when the 3D gesture of the user is recognized. A calculation module 503 is configured to calculate an operational position of the 3D gesture corresponding to the 3D input GUI if the recognized 3D gesture is the preset 3D gesture. In some implementations, the calculation module 503 is configured to also: 1) calculate a duration of the 3D gesture before calculating the operational position of the 3D gesture corresponding to the 3D input GUI; 2) judge whether the duration of the 3D gesture is lower than a preset threshold; and 3) execute the operation of calculating the operational position of the 3D gesture corresponding to the 3D input GUI, if the duration of the 3D gesture is lower than the preset threshold. An input module 504 is configured to select a virtual input element associated with the 3D input GUI and corresponding to the calculated operational position. The input module 504 also is configured to read informational input indicated by the virtual input element. In some implementation, the input module 504 is further configured to also emphasize the selected virtual input element in the 3D input GUI. An output module 505 configured to output the 3D input GUI when the operational position corresponds to a position where the virtual trigger element is located.

Figure 6:
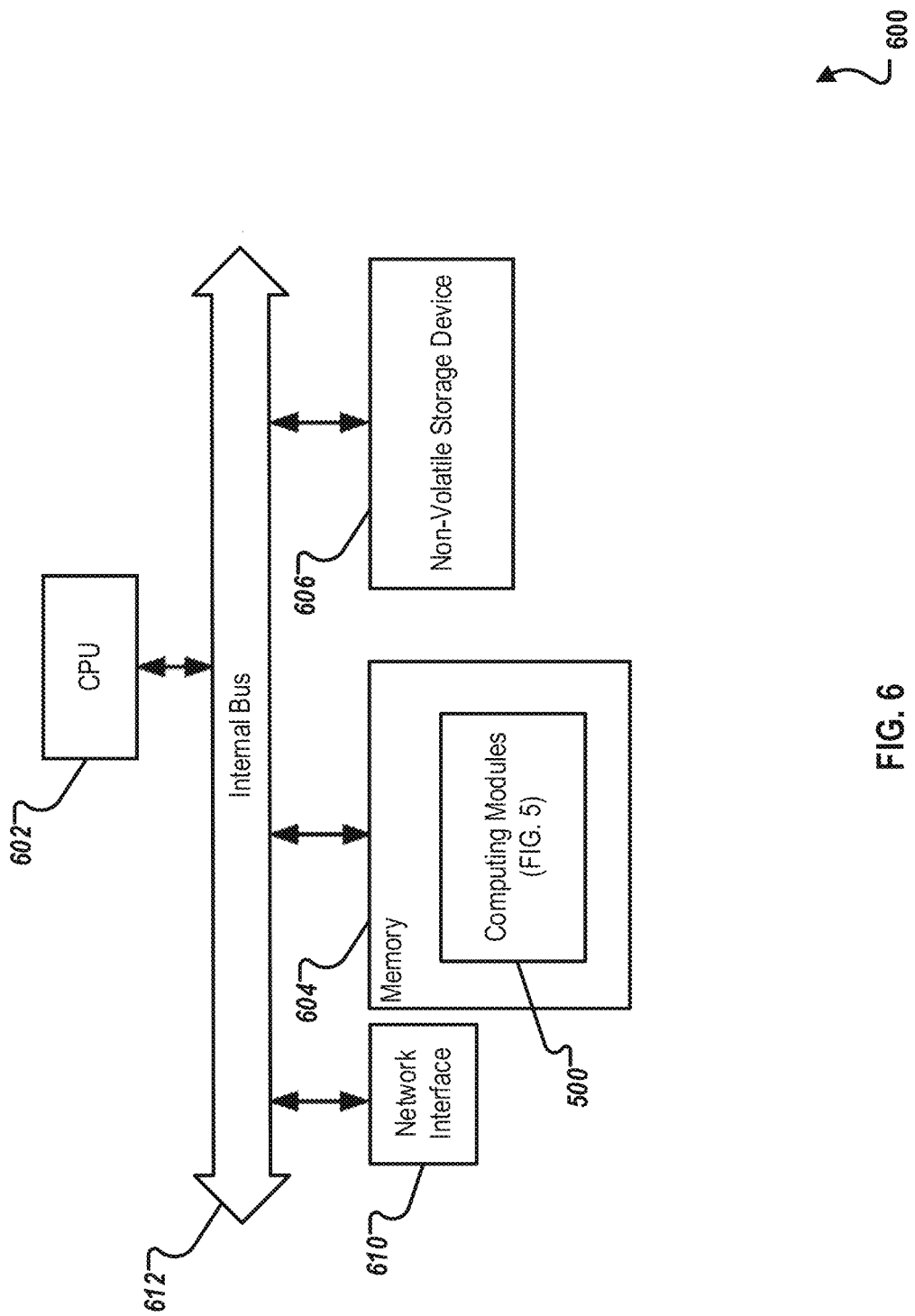
FIG. 6 is a block diagram illustrating an example of computing hardware components associated with the example VR client terminal of FIG. 5, according to an implementation of the present disclosure.

FIG. 6 is a block diagram illustrating an example of computing hardware components 600 associated with the example VR client terminal of FIG. 5, according to an implementation of the present disclosure. As illustrated in FIG. 6, the VR client terminal includes a central processing unit (CPU) 602, a computer memory 604, a nonvolatile storage device 606, a network interface 610, and an internal bus 612. In some implementations, FIG. 6 can include or be included by the computing system illustrated in FIG. 7. In some implementations, some or all components illustrated in FIGS. 6 and 7 can be considered to be the same (for example, CPU 602/Processor 705 and Memory 604/Memory 707). In some implementations, the computing modules 500 used for input operations associated with a VR client terminal can be loaded, stored, and executed by CPU 602 in Memory 604 (as a software-hardware-combined logic computing system).

Those of ordinary skill in the art will be able to conceive of other implementations of the present disclosure following consideration of the instant specification and practice of the disclosed subject matter. The present disclosure is intended to cover any variations, usages, or adaptations of the described subject matter, including variations, usages, or adaptations consistent with the general principles of the present disclosure, and including common knowledge or non-disclosed conventional technical means in the art. The provided examples are intended to enhance understanding of the described concepts, and are not intended to limit applicability of the disclosure in any way.

It should also be understood that, the present disclosure is not limited only the described implementations or as illustrated in the accompanying drawings. Various modifications and changes may be made without departing from the scope of the present application. The scope of the present application is limited only by the included claims. Any modifications, equivalent replacements, or improvements made within the spirit and principles of the present disclosure are considered to be within the scope and protection scope of the present disclosure.

Figure 7:
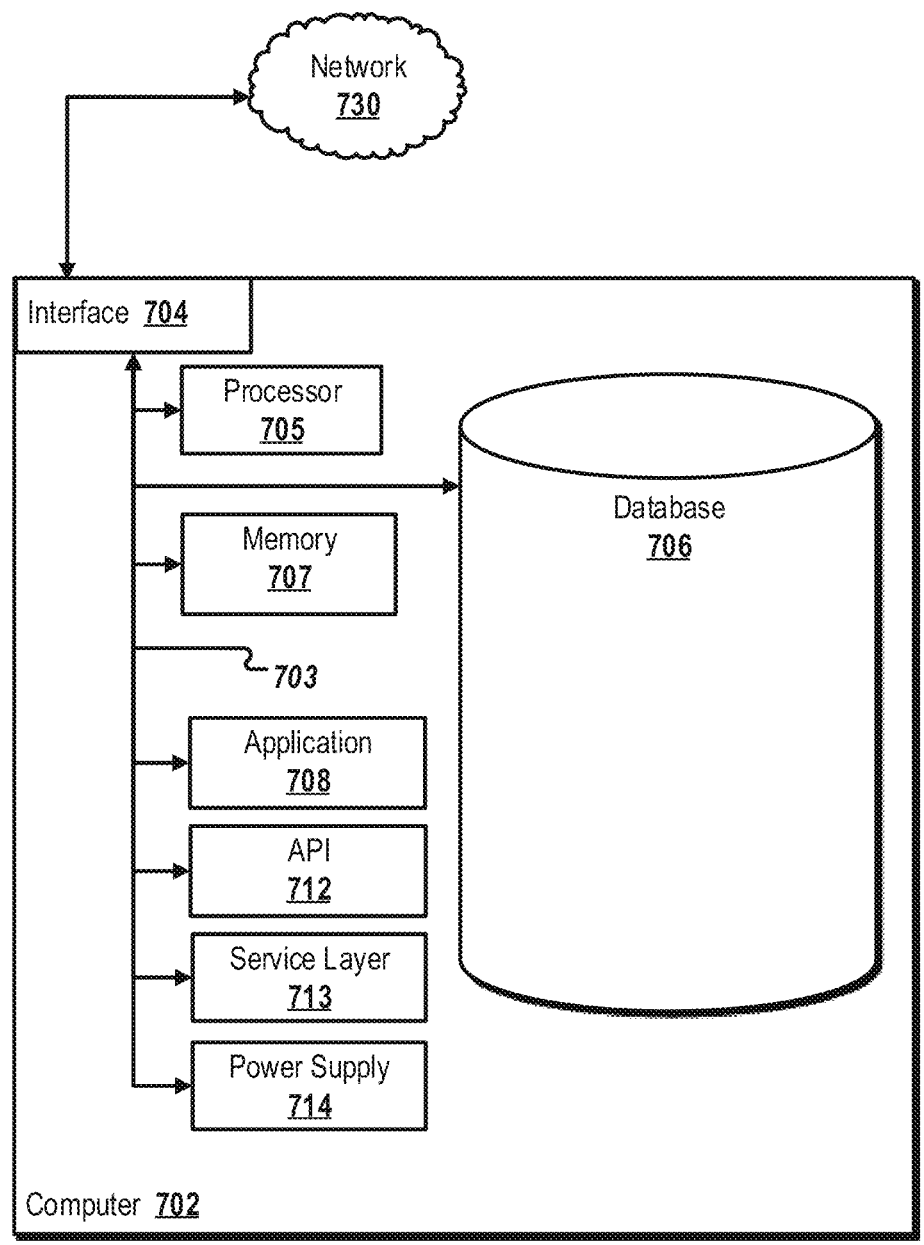
FIG. 7 is a block diagram illustrating an example of a computer-implemented system used to provide computational functionalities associated with described algorithms, methods, functions, processes, flows, and procedures, according to an implementation of the present disclosure.

FIG. 7 is a block diagram illustrating an example of a computer-implemented system 700 used to provide computational functionalities associated with described algorithms, methods, functions, processes, flows, and procedures, according to an implementation of the present disclosure. In the illustrated implementation, system 700 includes a computer 702 and a network 730.

The illustrated computer 702 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 702 can comprise a computer that includes an input device, such as a keypad, keyboard, touch screen, another input device, or a combination of input devices that can accept user information, and an output device that conveys information associated with the operation of the computer 702, including digital data, visual, audio, another type of information, or a combination of types of information, on a graphical-type user interface (UI) (or GUI) or other UI.

The computer 702 can serve in a role in a distributed computing system as a client, network component, a server, a database or another persistency, another role, or a combination of roles for performing the subject matter described in the present disclosure. The illustrated computer 702 is communicably coupled with a network 730. In some implementations, one or more components of the computer 702 can be configured to operate within an environment, including cloud-computing-based, local, global, another environment, or a combination of environments.

At a high level, the computer 702 is an electronic computing device operable to receive, transmit, process, store, or manage data and information associated with the described subject matter. According to some implementations, the computer 702 can also include or be communicably coupled with a server, including an application server, e-mail server, web server, caching server, streaming data server, another server, or a combination of servers.

The computer 702 can receive requests over network 730 (for example, from a client software application executing on another computer 702) and respond to the received requests by processing the received requests using a software application or a combination of software applications. In addition, requests can also be sent to the computer 702 from internal users (for example, from a command console or by another internal access method), external or third-parties, or other entities, individuals, systems, or computers.

Each of the components of the computer 702 can communicate using a system bus 703. In some implementations, any or all of the components of the computer 702, including hardware, software, or a combination of hardware and software, can interface over the system bus 703 using an application programming interface (API) 712, a service layer 713, or a combination of the API 712 and service layer 713. The API 712 can include specifications for routines, data structures, and object classes. The API 712 can be either computer-language independent or dependent and refer to a complete interface, a single function, or even a set of APIs. The service layer 713 provides software services to the computer 702 or other components (whether illustrated or not) that are communicably coupled to the computer 702. The functionality of the computer 702 can be accessible for all service consumers using this service layer. Software services, such as those provided by the service layer 713, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 702, alternative implementations can illustrate the API 712 or the service layer 713 as stand-alone components in relation to other components of the computer 702 or other components (whether illustrated or not) that are communicably coupled to the computer 702. Moreover, any or all parts of the API 712 or the service layer 713 can be implemented as a child or a sub-module of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702. The interface 704 is used by the computer 702 for communicating with another computing system (whether illustrated or not) that is communicatively linked to the network 730 in a distributed environment. Generally, the interface 704 is operable to communicate with the network 730 and comprises logic encoded in software, hardware, or a combination of software and hardware. More specifically, the interface 704 can comprise software supporting one or more communication protocols associated with communications such that the network 730 or interface's hardware is operable to communicate physical signals within and outside of the illustrated computer 702.

The computer 702 includes a processor 705. Although illustrated as a single processor 705 in FIG. 7, two or more processors can be used according to particular needs, desires, or particular implementations of the computer 702. Generally, the processor 705 executes instructions and manipulates data to perform the operations of the computer 702 and any algorithms, methods, functions, processes, flows, and procedures as described in the present disclosure.

The computer 702 also includes a database 706 that can hold data for the computer 702, another component communicatively linked to the network 730 (whether illustrated or not), or a combination of the computer 702 and another component. For example, database 706 can be an in-memory, conventional, or another type of database storing data consistent with the present disclosure. In some implementations, database 706 can be a combination of two or more different database types (for example, a hybrid in-memory and conventional database) according to particular needs, desires, or particular implementations of the computer 702 and the described functionality. Although illustrated as a single database 706 in FIG. 7, two or more databases of similar or differing types can be used according to particular needs, desires, or particular implementations of the computer 702 and the described functionality. While database 706 is illustrated as an integral component of the computer 702, in alternative implementations, database 706 can be external to the computer 702.

The computer 702 also includes a memory 707 that can hold data for the computer 702, another component or components communicatively linked to the network 730 (whether illustrated or not), or a combination of the computer 702 and another component. Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 or similar or differing types can be used according to particular needs, desires, or particular implementations of the computer 702 and the described functionality. While memory 707 is illustrated as an integral component of the computer 702, in alternative implementations, memory 707 can be external to the computer 702.

The application 708 is an algorithmic software engine providing functionality according to particular needs, desires, or particular implementations of the computer 702, particularly with respect to functionality described in the present disclosure. For example, application 708 can serve as one or more components, modules, or applications. Further, although illustrated as a single application 708, the application 708 can be implemented as multiple applications 708 on the computer 702. In addition, although illustrated as integral to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion or management circuits (including recharging, standby, or another power management functionality). In some implementations, the power-supply 714 can include a power plug to allow the computer 702 to be plugged into a wall socket or another power source to, for example, power the computer 702 or recharge a rechargeable battery.

There can be any number of computers 702 associated with, or external to, a computer system containing computer 702, each computer 702 communicating over network 730. Further, the term "client," "user," or other appropriate terminology can be used interchangeably, as appropriate, without departing from the scope of the present disclosure. Moreover, the present disclosure contemplates that many users can use one computer 702, or that one user can use multiple computers 702.

Described implementations of the subject matter can include one or more features, alone or in combination.

For example, in a first implementation, a computer-implemented method, comprising: receiving hand displacement data from sensing hardware; analyzing the received hand displacement data using a three-dimensional (3D) gesture recognition algorithm; recognizing that the received hand displacement data represents a 3D gesture; calculating an operational position of the 3D gesture with respect to a 3D input graphical user interface (GUI); selecting a virtual input element associated with the 3D input GUI and corresponding to the calculate operational position; and reading input information corresponding to the selected virtual input element.

The foregoing and other described implementations can each, optionally, include one or more of the following features:

A first feature, combinable with any of the following features, wherein the sensing hardware includes one or more image sensors, laser sensors, or radar sensors.

A second feature, combinable with any of the previous or following features, wherein the sensing hardware includes one or more image sensors, laser sensors, or radar sensors.

A third feature, combinable with any of the previous or following features, wherein recognizing that the received hand displacement data represents the 3D gesture further comprises: calculating a rotation quantity and offset of the hand of the user with respect to an X/Y/Z-axes of the VR scenario; and generating the 3D gesture model using the calculated rotation quantity and offset of the hand of the user.

A fourth feature, combinable with any of the previous or following features, further comprising: comparing the 3D gesture model of the 3D gesture with at least one preset 3D gesture model; and determining that the 3D gesture model of the 3D gesture matches the at least one preset 3D gesture model.

A fifth feature, combinable with any of the previous or following features, wherein the determination that the 3D gesture model of the 3D gesture matches the at least one preset 3D gesture model depends on a comparison of several corresponding feature points selected from the generated 3D gesture model and the at least one preset 3D gesture model.

A sixth feature, combinable with any of the previous or following features, wherein: the rotation quantity refers to a deviation angle by which a pre-selected feature point on the hand of the user is rotated with respect to the X/Y/Z-axes of the VR scenario when the hand of the user performs the 3D gesture; and the offset refers to a horizontal distance from the pre-selected feature point on the hand of the user to the X/Y/Z-axes of the VR scenario when the hand of the user performs the 3D gesture.

In a second implementation, a non-transitory, computer-readable medium storing one or more instructions executable by a computer system to perform operations comprising: receiving hand displacement data from sensing hardware; analyzing the received hand displacement data using a three-dimensional (3D) gesture recognition algorithm; recognizing that the received hand displacement data represents a 3D gesture; calculating an operational position of the 3D gesture with respect to a 3D input graphical user interface (GUI); selecting a virtual input element associated with the 3D input GUI and corresponding to the calculate operational position; and reading input information corresponding to the selected virtual input element.

The foregoing and other described implementations can each, optionally, include one or more of the following features:

A first feature, combinable with any of the following features, wherein the sensing hardware includes one or more image sensors, laser sensors, or radar sensors.

A second feature, combinable with any of the previous or following features, wherein the 3D gesture is performed by a user in a VR scenario displayed in a VR environment.

A third feature, combinable with any of the previous or following features, wherein recognizing that the received hand displacement data represents the 3D gesture further comprises one or more operations to: calculate a rotation quantity and offset of the hand of the user with respect to an X/Y/Z-axes of the VR scenario; and generate the 3D gesture model using the calculated rotation quantity and offset of the hand of the user.

A fourth feature, combinable with any of the previous or following features, further comprising one or more instructions to: compare the 3D gesture model of the 3D gesture with at least one preset 3D gesture model; and determine that the 3D gesture model of the 3D gesture matches the at least one preset 3D gesture model.

A fifth feature, combinable with any of the previous or following features, wherein the determination that the 3D gesture model of the 3D gesture matches the at least one preset 3D gesture model depends on a comparison of several corresponding feature points selected from the generated 3D gesture model and the at least one preset 3D gesture model.

A sixth feature, combinable with any of the previous or following features, wherein: the rotation quantity refers to a deviation angle by which a pre-selected feature point on the hand of the user is rotated with respect to the X/Y/Z-axes of the VR scenario when the hand of the user performs the 3D gesture; and the offset refers to a horizontal distance from the pre-selected feature point on the hand of the user to the X/Y/Z-axes of the VR scenario when the hand of the user performs the 3D gesture.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform operations comprising: receiving hand displacement data from sensing hardware; analyzing the received hand displacement data using a three-dimensional (3D) gesture recognition algorithm; recognizing that the received hand displacement data represents a 3D gesture; calculating an operational position of the 3D gesture with respect to a 3D input graphical user interface (GUI); selecting a virtual input element associated with the 3D input GUI and corresponding to the calculate operational position; and reading input information corresponding to the selected virtual input element.

The foregoing and other described implementations can each, optionally, include one or more of the following features:

A first feature, combinable with any of the following features, wherein the sensing hardware includes one or more image sensors, laser sensors, or radar sensors.

A second feature, combinable with any of the previous or following features, wherein the 3D gesture is performed by a user in a VR scenario displayed in a VR environment.

A third feature, combinable with any of the previous or following features, wherein recognizing that the received hand displacement data represents the 3D gesture further comprises operations to: calculate a rotation quantity and offset of the hand of the user with respect to an X/Y/Z-axes of the VR scenario; and generate the 3D gesture model using the calculated rotation quantity and offset of the hand of the user.

A fourth feature, combinable with any of the previous or following features, further comprising one or more operations to: compare the 3D gesture model of the 3D gesture with at least one preset 3D gesture model; and determine that the 3D gesture model of the 3D gesture matches the at least one preset 3D gesture model.

A fifth feature, combinable with any of the previous or following features, wherein the determination that the 3D gesture model of the 3D gesture matches the at least one preset 3D gesture model depends on a comparison of several corresponding feature points selected from the generated 3D gesture model and the at least one preset 3D gesture model.

A sixth feature, combinable with any of the previous or following features, wherein: the rotation quantity refers to a deviation angle by which a pre-selected feature point on the hand of the user is rotated with respect to the X/Y/Z-axes of the VR scenario when the hand of the user performs the 3D gesture; and the offset refers to a horizontal distance from the pre-selected feature point on the hand of the user to the X/Y/Z-axes of the VR scenario when the hand of the user performs the 3D gesture.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving, from sensing hardware, hand displacement data representative of a three-dimensional (3D) hand gesture;
   providing a visual prompt to modify the 3D hand gesture to conform to one or more preset 3D gesture models;
   receiving, based upon the visual prompt, modified hand displacement data;
   in response to determining that the modified hand displacement data conforms to the one or more preset 3D gesture models, calculating an operational position of the 3D hand gesture with respect to a 3D input graphical user interface (GUI);
   receiving, based upon the 3D hand gesture, input manipulating movement of virtual input elements associated with the 3D input GUI;
   selecting, based upon the input manipulating movement, one or more of the virtual input elements associated with the 3D input GUI; and
   reading, based upon selecting one or more virtual input elements, input information corresponding to the selected one or more virtual input elements.

2. The computer-implemented method of claim 1, wherein the 3D input GUI includes a cubic array of the virtual input elements.

3. The computer-implemented method of claim 2, wherein each of the virtual input elements includes display of a number, an image, or a symbol.

4. The computer-implemented method of claim 2, wherein each of three adjacent sides of the cubic array of the virtual input elements are displayed by the 3D input GUI.

5. The computer-implemented method of claim 1, wherein the hand displacement data is received in a VR scenario and the hand displacement data is represented by a 3D hand gesture model displayed within a VR environment.

6. The computer-implemented method of claim 5, wherein the receiving input manipulating movement of virtual input elements associated with the 3D input GUI includes:
   manipulating the 3D hand gesture model displayed within the VR environment; and rotating, based upon manipulating the 3D hand gesture model, the 3D input GUI about one or more of X/Y/Z-axes of the VR scenario.

7. The computer-implemented method of claim 6, further comprising selecting, based upon additional input manipulating movement of the 3D input GUI, an additional one or more of the virtual input elements associated with the 3D input GUI.

8. A non-transitory, computer-readable medium storing one or more instructions executable by a computer system to perform operations comprising:
    receiving, from sensing hardware, hand displacement data representative of a three-dimensional (3D) hand gesture;
    providing a visual prompt to modify the 3D hand gesture to conform to one or more preset 3D gesture models;
    receiving, based upon the visual prompt, modified hand displacement data;
    in response to determining that the modified hand displacement data conforms to the one or more preset 3D gesture models, calculating an operational position of the 3D hand gesture with respect to a 3D input graphical user interface (GUI);
    receiving, based upon the 3D hand gesture, input manipulating movement of virtual input elements associated with the 3D input GUI;
    selecting, based upon the input manipulating movement, one or more of the virtual input elements associated with the 3D input GUI; and
    reading, based upon selecting one or more virtual input elements, input information corresponding to the selected one or more virtual input elements.

9. The non-transitory, computer-readable medium of claim 8, wherein the 3D input GUI includes a cubic array of the virtual input elements.

10. The non-transitory, computer-readable medium of claim 9, wherein each of the virtual input elements includes display of a number, an image, or a symbol.

11. The non-transitory, computer-readable medium of claim 9, wherein each of three adjacent sides of the cubic array of the virtual input elements are displayed by the 3D input GUI.

12. The non-transitory, computer-readable medium of claim 8, wherein the hand displacement data is received in a VR scenario and the hand displacement data is represented by a 3D hand gesture model displayed within a VR environment.

13. The non-transitory, computer-readable medium of claim 12, wherein the receiving input manipulating movement of virtual input elements associated with the 3D input GUI includes:
    manipulating the 3D hand gesture model displayed within the VR environment; and
    rotating, based upon manipulating the 3D hand gesture model, the 3D input GUI about one or more of X/Y/Z-axes of the VR scenario.

14. The non-transitory, computer-readable medium of claim 13, further comprising selecting, based upon additional input manipulating movement of the 3D input GUI, an additional one or more of the virtual input elements associated with the 3D input GUI.

15. A computer-implemented system, comprising:
    one or more computers; and
    one or more computer memory devices interoperably coupled with the one or more computers and having tangible, non-transitory, machine-readable media storing one or more instructions that, when executed by the one or more computers, perform operations comprising:
        receiving, from sensing hardware, hand displacement data representative of a three-dimensional (3D) hand gesture;
        providing a visual prompt to modify the 3D hand gesture to conform to one or more preset 3D gesture models;
        receiving, based upon the visual prompt, modified hand displacement data;
        in response to determining that the modified hand displacement data conforms to the one or more preset 3D gesture models, calculating an operational position of the 3D hand gesture with respect to a 3D input graphical user interface (GUI);
        receiving, based upon the 3D hand gesture, input manipulating movement of virtual input elements associated with the 3D input GUI;
        selecting, based upon the input manipulating movement, one or more of the virtual input elements associated with the 3D input GUI; and
        reading, based upon selecting one or more virtual input elements, input information corresponding to the selected one or more virtual input elements.

16. The computer-implemented system of claim 15, wherein the 3D input GUI includes a cubic array of the virtual input elements.

17. The computer-implemented system of claim 16, wherein each of the virtual input elements includes display of a number, an image, or a symbol.

18. The computer-implemented system of claim 16, wherein each of three adjacent sides of the cubic array of the virtual input elements are displayed by the 3D input GUI.

19. The computer-implemented system of claim 15, wherein the hand displacement data is received in a VR scenario and the hand displacement data is represented by a 3D hand gesture model displayed within a VR environment.

20. The computer-implemented system of claim 19, wherein the receiving input manipulating movement of virtual input elements associated with the 3D input GUI includes:
    manipulating the 3D hand gesture model displayed within the VR environment; and
    rotating, based upon manipulating the 3D hand gesture model, the 3D input GUI about one or more of X/Y/Z-axes of the VR scenario.

* * * * *